(12) United States Patent
Hardin

(10) Patent No.: US 8,973,617 B2
(45) Date of Patent: Mar. 10, 2015

(54) GEOTHERMAL PIPE SYSTEM

(76) Inventor: James Hardin, Greenwood, IN (US)

( * ) Notice: Subject to any disclaimer, the term of this patent is extended or adjusted under 35 U.S.C. 154(b) by 617 days.

(21) Appl. No.: 13/072,620

(22) Filed: Mar. 25, 2011

(65) Prior Publication Data

US 2011/0232795 A1    Sep. 29, 2011

Related U.S. Application Data

(60) Provisional application No. 61/340,988, filed on Mar. 25, 2010.

(51) Int. Cl.
*F16L 9/18* (2006.01)
*F16L 9/19* (2006.01)
*F16L 9/00* (2006.01)
*F24J 3/08* (2006.01)

(52) U.S. Cl.
CPC . *F16L 9/19* (2013.01); *F16L 9/006* (2013.01); *F24J 3/083* (2013.01); *Y02E 10/125* (2013.01)
USPC .......................................... 138/116; 138/111

(58) Field of Classification Search
CPC ............... F16L 9/00; F16L 9/006; F16L 9/19; F24J 3/083; Y02E 10/125
USPC .......... 138/111, 116; 165/45; 166/90.1, 305.1
See application file for complete search history.

(56) References Cited

U.S. PATENT DOCUMENTS

| | | | |
|---|---|---|---|
| 3,958,637 A | 5/1976 | Cobbs | |
| 4,625,797 A | 12/1986 | Tsutsumi et al. | |
| 4,714,108 A | 12/1987 | Barry | |
| 4,842,068 A | 6/1989 | Vercaemer et al. | |
| 5,630,447 A | 5/1997 | Jensen | |
| 5,651,251 A | 7/1997 | Hardin | |
| 5,727,621 A | 3/1998 | Hardin | |
| 6,000,459 A | 12/1999 | Jeppesen | |
| 6,035,949 A | 3/2000 | Altschuler et al. | |
| 6,053,239 A | 4/2000 | Hardin | |
| 6,454,010 B1 | 9/2002 | Thomas et al. | |
| 7,048,037 B2 | 5/2006 | McNair | |
| 7,213,649 B2 | 5/2007 | McNair et al. | |
| 2008/0289795 A1 | 11/2008 | Hardin et al. | |

OTHER PUBLICATIONS

Search Report dated Jul. 6, 2011 relating to Hardin, International Application No. PCT/US2011/030099.
Search Report dated Sep. 2, 2008 relating to Hardin, International Application No. PCT/US2008/064808.

*Primary Examiner* — Paul R Durand
*Assistant Examiner* — Vishal Pancholi
(74) *Attorney, Agent, or Firm* — E. Victor Indiano; Indiano Law Group, LLC

(57) ABSTRACT

A pipe is provided for use in a geothermal heat exchange system. The pipe is insertable in a bore hole having a proximal end disposed relatively closer to a surface of the earth, and a distal end disposed relatively further from the surface of the earth. The pipe comprises an inflow pipe portion having a first end and a second end, an outer wall portion and an inner wall portion extending between the first and second ends for defining an inflow chamber that extends generally between the first end and the second end of the inflow pipe portion. Water can flow through the inflow chamber between the first and second ends of the inflow pipe portion in a direction toward the distal end of the bore hole.

18 Claims, 15 Drawing Sheets

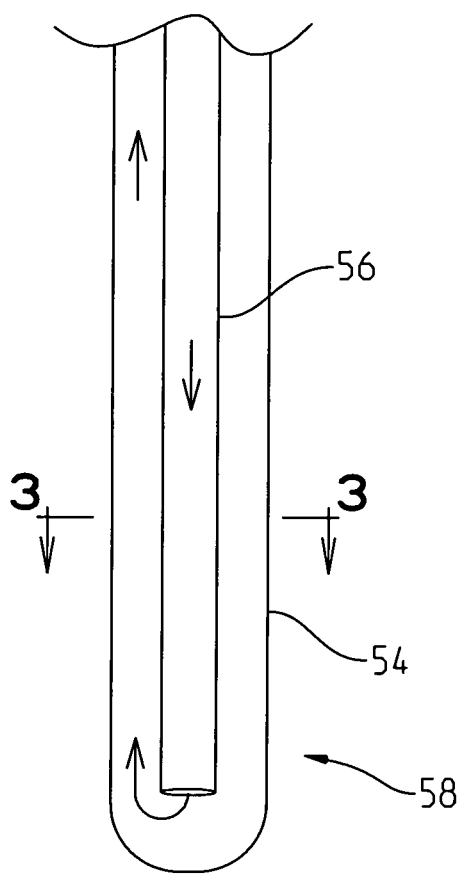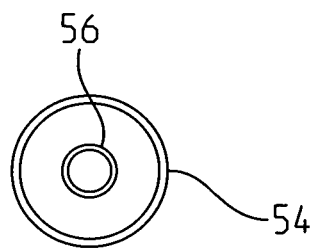
FIG. 2
Prior Art
FIG. 3

GEOTHERMAL PIPE SYSTEM

PRIORITY CLAIM

The instant application claims priority to James R. Hardin, U.S. Provisional Patent Application No. 61/340,988 filed on 25 Mar. 2010, which is fully incorporated herein by reference.

I. TECHNICAL FIELD OF THE INVENTION

The present invention relates to a heat exchanger, and more particularly to a heat exchanger that is especially well adapted for use in geothermal heating and cooling systems, as a thermal energy storage device.

II. BACKGROUND OF THE INVENTION

A geothermal heating and cooling system obtains its ability to aid in the heating or cooling of a building by exploiting the general constancy of ground temperatures. A typical geothermal heating system comprises a closed loop pipe system through which water is pumped. A portion of the pipe is disposed underground in one or more (usually several), bore holes that are drilled into the ground. As the water in the pipe travels in the pipe down and up the bore hole(s), the temperature of the ground surrounding the bore holes serves to either add heat to the water in the pipe or absorb heat from the water in the pipe, depending upon whether the water within the pipe is hotter or cooler than the surrounding ground temperature.

Since the ground surrounding the one or more bore holes remains at a generally constant temperature, the water passing through the pipe can, at least theoretically can be heated or cooled to this constant temperature regardless of the season. This enables the geothermal system to deliver water for use at the building that is generally at the same temperature on a year-round basis. The water that passes through the geothermal heating piping system can be passed through a heat exchanger, to which a blower is attached to pass the air over the heat exchanger.

Most geothermal systems are used in conjunction with a mechanical refrigeration system. One method for improving the efficiency of such a mechanical refrigeration system is to immerse the heat exchanger in a liquid medium such as water. Use of water as a heat exchange medium helps to improve the efficiency because: (1) water is a better heat exchange medium than air; and (2) water in the heat exchanger can be placed at a more appropriate temperature (cooler in summer, warmer in winter) than the corresponding air. To capitalize on these efficiencies, a geothermal heating system can be coupled to a mechanical refrigeration system to provide the more appropriate temperature and water.

In order to prevent the pollution of aquifers, most geothermal energy systems are constructed as closed-loop systems, where water is constantly re-circulated through a closed-loop. A typical prior art geothermal installation is schematically represented in FIG. 1. A building 10, such as a house, school, factory, office building or the like, includes a mechanical refrigeration system 12, to which the geothermal system 36 is coupled. The mechanical refrigeration system 12 includes an inside (first) heat exchanger 14 and an outside (second) heat exchanger 18. In a heat pump-type mechanical refrigeration system, the inside heat exchanger 14 serves as an evaporator when the system 12 is serving as an air conditioner, and as a condenser when a mechanical refrigeration system 12 is serving as a heating unit. Conversely, the outside heat exchanger 18 serves as a condenser when the mechanical refrigeration system 12 is being used as an air conditioner or cooler, and serves as an evaporator when the mechanical refrigeration system 12 is being used as a heater.

The inside heat exchanger 14 includes a coil 16 through which refrigerant flows, and a fan 22 for pulling air through the inside heat exchanger 14 cabinet, to move air past and over the coil 16, so that the air thus moved by will become cooled through its contact with the coil 16 when the mechanical refrigeration system 12 is being used as an air conditioner, and will become heated when the mechanical refrigeration system 12 is using the inside heat exchanger 14 as a condenser during a heating operation. The outside heat exchanger 18 also includes a coil that is part of the closed-loop of the mechanical refrigeration system. The inside and outside heat exchangers 16, 18 can be constructed generally similarly, except that the outside heat exchanger should be weatherized to withstand outside weather conditions.

An expansion valve 24 and a compressor 26 are provided for allowing the refrigerant to expand (expansion valve 24), and to compress the refrigerant (compressor 26). The outside heat exchanger includes a cabinet 28 that contains the coil 20. The cabinet 28 includes an inflow port 30 through which water from the geothermal heat exchange system 36 can enter the interior of the cabinet 28, and an outflow port 32 from which water of the geothermal exchange system 36 can exit the cabinet 28.

The geothermal exchange system 36 is shown as comprising a closed-loop pipe system 38, wherein water or other fluid within the geothermal system 36 is re-circulated. The geothermal exchange system includes an inflow pipe 40 that brings water into the cabinet 28 of the outside heat exchanger 18, and an outflow pipe 42 that carries water away from the cabinet 28 of the outside heat exchanger 18. A pump 44 is provided for pumping water through the closed-loop geothermal heating system.

The outflow pipe 42 includes one or more subterranean portions 46, that is (are) disposed below ground level. Although only one bore hole is shown in FIG. 1, most geothermal systems include a plurality of bore holes. The inflow pipe 40 also includes a subterranean portion 48 disposed below ground level. The subterranean portions 46, 48 of the outflow pipe 42 and inflow pipe 40 are joined at a U-shaped connector 50, so that water reaching the lower "end" of the outflow pipe 42 can flow through the connector 50 into the inflow pipe 40.

The subterranean portions 46, 48 are typically positioned within one or more bore holes 52. In a "vertical" geothermal system, the bore holes may be quite deep, and may often exceed 100 feet (30.5 m) in length, and bore holes of 1000 feet (305 m) in length are not rare. Typically, a bore hole of six to eight inches (15.3 cm to 20.3 cm) in diameter is employed, as a bore hole of that size will provide enough area for the insertion of both the subterranean portions 46, 48 of the inflow pipe 40 and outflow pipe 42.

After the bore hole 52 is dug, and the subterranean portions 46, 48 of the outflow pipe 42 and inflow pipe 40 are inserted into the bore hole 52, the area around the pipe is packed with a grouting material, that may comprise bentonite. The grouting is provided both for providing stability to the hole, and also to prevent water or fluid flowing through the inflow and outflow pipes 40, 42 from coming in contact with any water and any aquifers through which the pipes 40, 42 may pass.

The depth of the bore hole will vary based on a variety of factors, including cost. For the two-separate side-by-side pipe type system shown in FIG. 1, the installer must normally employ a bore hole having a six inch (15.3 cm) diameter or greater, in order to accommodate the pipes. At typical 2007 prices, the cost of drilling a single 100 foot (30 m), six inch (0.15 m) diameter is somewhere between about $US600.00 and $US800.00. As drilling is charged as a function of both length of the bore and diameter of the bore, it is preferable to drill the hole no deeper or wider than necessary, and one can reduce costs by finding a way to employ a smaller (diameter), short (length) hole to replace a wider (longer) hole.

The second consideration relates to heat exchange capacity. As water flowing through the subterranean portions 46, 48 of the pipe exchanges heat with the ground in which the bore hole is dug, a deeper (longer) bore hole provides a greater heat exchange capacity than a shallower (shorter) bore hole, since a longer (deeper) bore hole provides a greater residence time for water within the subterranean portions 46, 48 of a geothermal system, and provides a greater surface area of "ground" with which to exchange heat.

In this regard, the Applicant has found, that a "ton" of heating or cooling capacity is typically achieved by a bore hole of between 150 and 200 feet (46 and 61 m) with a side-by-side pipe system. By way of example, to achieve four tons of heating and cooling capacity a bore holes of between 600 and 800 fee (183 and 244 m) should be drilled.

Another factor that affects the decision of how deep or long to drill the bore hole (and hence, its associated cost) relates to the heat exchange capacity of the particular materials used in constructing the subterranean portions 46, 48 of the pipe, and the grout that is disposed in the space 52 between the pipes and the edge of the bore hole. Efficiency considerations must be balanced with environmental considerations and reliability considerations that also impact the geothermal system constructor's ability to achieve optimum heat exchange capabilities. For example, although metal pipes have a greater thermal conductivity than plastics, e.g. polybutylene piping, steel and metal pipes are not preferred for use as they have a propensity to corrode, and thereby fail over a reasonably short period of time.

Environmental concerns also factor into the technologies by which one can construct a geothermal system. For example, that many jurisdictions forbid the use of "pump and dump" geothermal systems, where the water for the geothermal system is drawn from an aquifer, run through the heat exchanger, and then deposited back into the aquifer.

In order to protect the aquifer, it is often required that the system be sealed from the "soil" of the walls of the bore hole through the use of some impervious grout material (e.g. impervious bentonite clay) that prevents water in the pipe 46, 48 from leaking into the aquifer. Unfortunately, the grout adversely impacts the heat transfer capabilities of the pipe that are usually overcome by drilling the bore hole much deeper than if the pipes 46, 48 could contact the soil directly.

One improvement to the above-mentioned dual-pipe system is a concentric pipe system invented earlier by the Applicant, James Hardin. The concentric (and typically co-axial) pipe is schematically shown in FIGS. 2 and 3 as including an outer, outflow pipe 54, that preferably has a 3" (7.6 cm) diameter, and an inflow pipe 56. The inflow pipe 56 is disposed concentrically and interiorly of the outflow pipe 54, and typically has a one or 1.25 inch (2.54 or 3.2) cm diameter.

The concentric pipe has significant benefits over the twin-pipe system shown in FIG. 1. One benefit is that it can be placed in a smaller bore hole, such as a 4" or 4.5" (10 or 11.5 cm) diameter bore hole, rather than the 6" (15.25 cm) diameter bore hole typically used for the twin-pipe system shown in FIG. 1. This use of a smaller bore hole helps to reduce drilling costs, as it costs less per foot (typically $6.00 per foot for a 4 or 4.5" bore hole (10 or 11.5 cm) versus $8.00 per foot (0.3 m) for a 6" (15.25 cm) bore hole at 2007 prices. Additionally, because of the configuration of the concentric pipe arrangement 54, 56, a smaller gap usually exists between the exterior wall of the outflow pipe 54, and the inner wall of the bore hole. This smaller gap reduces the amount of grout that must be placed between the concentric pipe 53 and concentric pipe 58 and the bore hole wall. Using a thinner layer of grout both helps to reduce grout costs, and permits better heat exchange between concentric pipe system 58 and the grout surrounding the bore hole.

Although the above two described configurations do perform their functions in a workman-like manner, room for improvement exists. Accordingly, it is one object of the present invention to provide an improved pipe system for use in connection with a geothermal energy system.

Another known geothermal Pipe system is the Applicant's Hardin three-chambered "Bisect" pipe system, that is shown in James Hardin Published Patent Application No. 2008/0289795 A1, published 27 Nov. 2008, that performs its job in a very workmanlike manner. The Hardin Bisect pipe includes a first chamber, a second chamber, and a central chamber. The first chamber comprises an inflow chamber, the second chamber comprises an outflow chamber, and the central chamber comprises a grouting chamber. The inflow chamber and the outflow chamber are each shaped like a half-washer, with the grouting chamber being generally circular in cross section. Grout outflow ports exist at spaced intervals. The grout outflow pipes connect the grout chamber 310, to the area adjacent to the outer wall 320 of the pipe.

One of the advantages of the Hardin bisect pipe is that it is generally believed to be more efficient, than prior pipes that it replaces, and that are discussed in more detail in the Hardin published bisect patent application that is incorporated herein by reference. However, room for improvement exists. In particular, room for improvement exists in creating an even more thermally efficient piping system, and also in creating a piping system that is better suited to manufacture through an extrusion process.

One deficiency with the bisect pipe is that it generally must be made by an injection molding process, rather than an extrusion process. Injection modling creates some additional labor requirements to assemble short length pipe segments together along with requiring the user to spend larger amounts of money on tooling, as injection modling tools are typically more expensive than extrusion tools.

III. SUMMARY OF THE INVENTION

In accordance with the present invention, a pipe is provided for use in a geothermal heat exchange system. The pipe is insertable in a bore hole having a proximal end disposed relatively closer to a surface of the earth, and a distal end disposed relatively further from the surface of the earth. The pipe comprises an inflow pipe portion having a first end and a second end. An outer wall portion and an inner wall portion of the inflow pipe portion extend between the first and second ends for defining an inflow chamber that extends generally between the first end and the second end of the inflow pipe portion. Water can flow through the inflow chamber between the first and second ends of the inflow pipe portion in a direction toward the distal end of the bore hole. An outflow pipe portion has a first end and a second end, an inner wall and an outer wall portion, that extend between the first and second ends of the outflow pipe portion for defining an outflow chamber that extends generally between the first and second end of the outflow portion. Water can flow through the outflow chamber between the second end and first end of the outflow pipe portion in a direction generally toward the proximal end of the bore hole. A first connector member is provided that has a first end coupled to the inflow pipe portion and a second end coupled to the outflow pipe portion.

In a preferred embodiment, the first connector member extends between the inflow pipe portion and the outflow pipe portion to maintain the inflow and outflow chambers in a spaced relation wherein the inflow chamber and outflow chamber do not include a common wall. The first connector member can intersect each of the inflow pipe portion and outflow pipe portion at an angle between about 5° and 175°. The pipe can comprise one of a plurality of pipe segments, wherein the plurality of pipe segments are coupled together in a generally co-linear end-to-end relation, to extend substantially all the way between the distal end and proximal end of the bore, so that the pipe segments, when so coupled, provide a generally continuous inflow chamber and a generally continuous outflow chamber that extends substantially all the way between the distal end and the proximal end of the bore.

In a most preferred embodiment, one of the inflow chamber and outflow chamber has a relatively greater volume, and the other of the inflow chamber and outflow chamber has a relatively smaller volume, wherein the chamber having the relatively small volume facilitates a greater velocity of flow of water therein than the velocity of flow in the chamber having the relatively greater volume. Additionally, in another highly preferred embodiment, the outer wall portion of the inflow pipe can include a perimeterally disposed cylindrical portion, and an inner wall portion of the inflow pipe can include a cylindrical portion disposed interiorly of, and generally concentrically with, the perimeterally disposed cylindrical portion of the inflow pipe.

One feature of the present invention is that it is preferably made from a bi-modally structured, high density polyethylene material. Presently, the Applicants' preferred material for manufacturing the device is a plastic known throughout the world (except in the U.S.) as "PE-100" and which is known in the United States as "PE4710". The Applicants' preferred plastic has a bi-modal structure, rather than the unimodal structure that is commonly used in connection with known pipes of the prior art. This bi-modal structure results in a higher strength pipe, so that a pipe of a given diameter is capable of withstanding much higher pressures than the unimodal pipe that it replaces. Additionally, the bi-modal structure results in better "slow crack resistance" and also better "rapid crack resistance", which results in both more rigid and is less subject to failure. Applicant believes that a bi-modal pipe is likely to have a longer and more problem resistant useful life than an unimodal pipe. Additionally, the preferred plastic used with the present invention permits the walls of the pipe to be made more thin, which enhances the thermal transfer between the water flowing within the interior of the pipe and exterior of the pipe including the grout and the surrounding ground.

The present invention is believed to have enhanced heat transfer capabilities, when compared to currently-existing pipes. These enhanced heat transfer capabilities, permit the user to achieve a level of heat transfer in a geothermal energy system, using a smaller length of pipe than with the prior art. By being able to achieve the same cooling capacity (e.g. 1 ton of cooling) with less pipe, the user can incur less boring costs because fewer feet of bore hole need be drilled, when compared with the prior art.

These and other features and advantages of the present invention will become apparent to those skilled in the art upon a review of the drawings and detailed description presented below, which represent the best mode of practicing the present invention perceived presenting by the Applicant.

IV. BRIEF DESCRIPTION OF THE DRAWINGS

FIG. 2 is a schematic view of an alternate embodiment "concentric pipe" geothermal heat exchange system;

FIG. 3 is a sectional view taken along lines 2-2 of a prior art concentric heat exchange system;

V. DETAILED DESCRIPTION OF PREFERRED EMBODIMENTS

Figure 4:
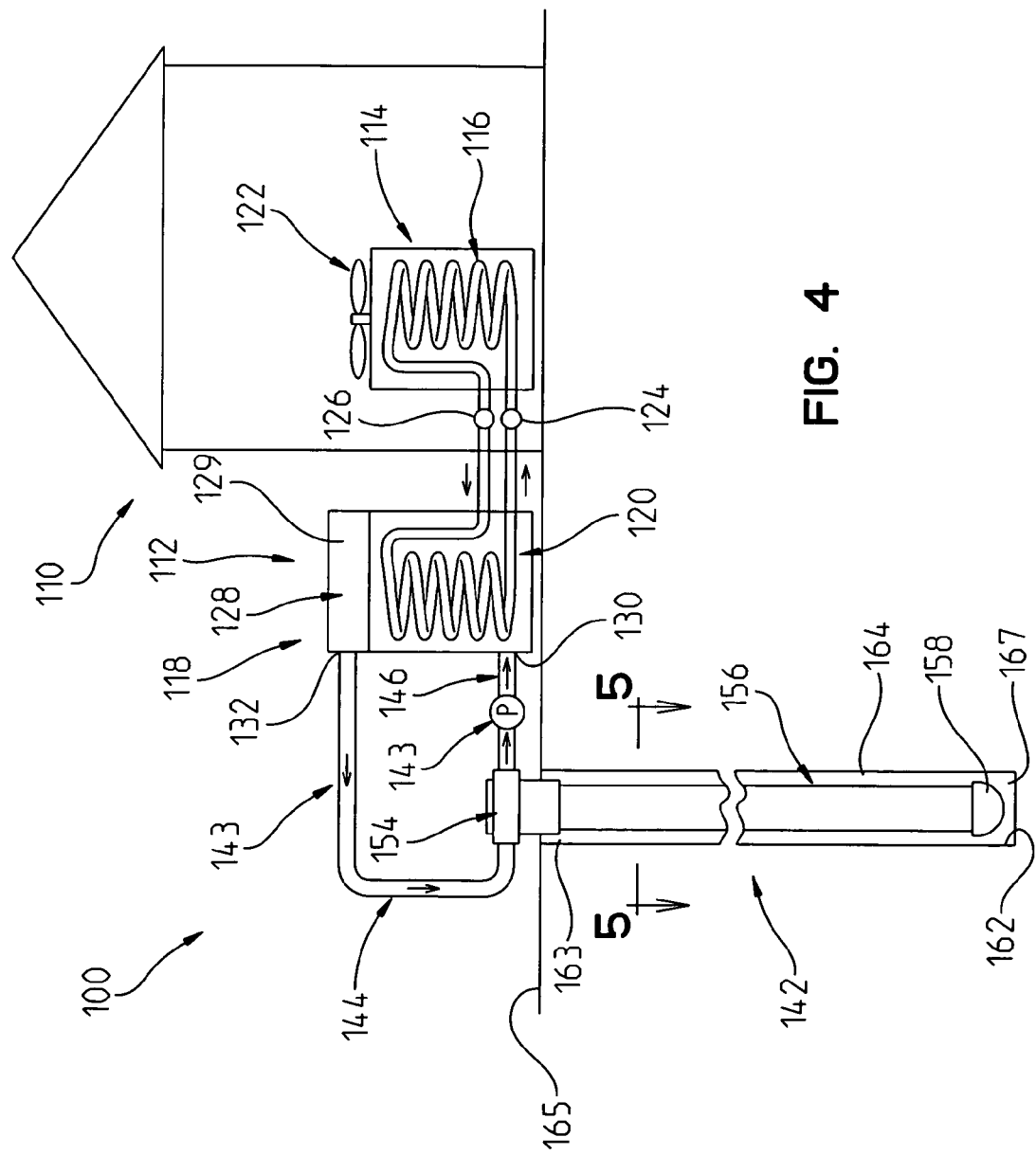
FIG. 4 is a schematic view of a geothermal heat exchange system of the present invention coupled to a mechanical refrigeration system of a building.

The geothermal heat exchange system 100 of the present invention is best shown in FIGS. 4-9. Turning first to FIG. 4, the geothermal heat exchange system 100 is shown schematically as being coupled to the mechanical refrigeration system 112 of a building 110.

Figure 1:
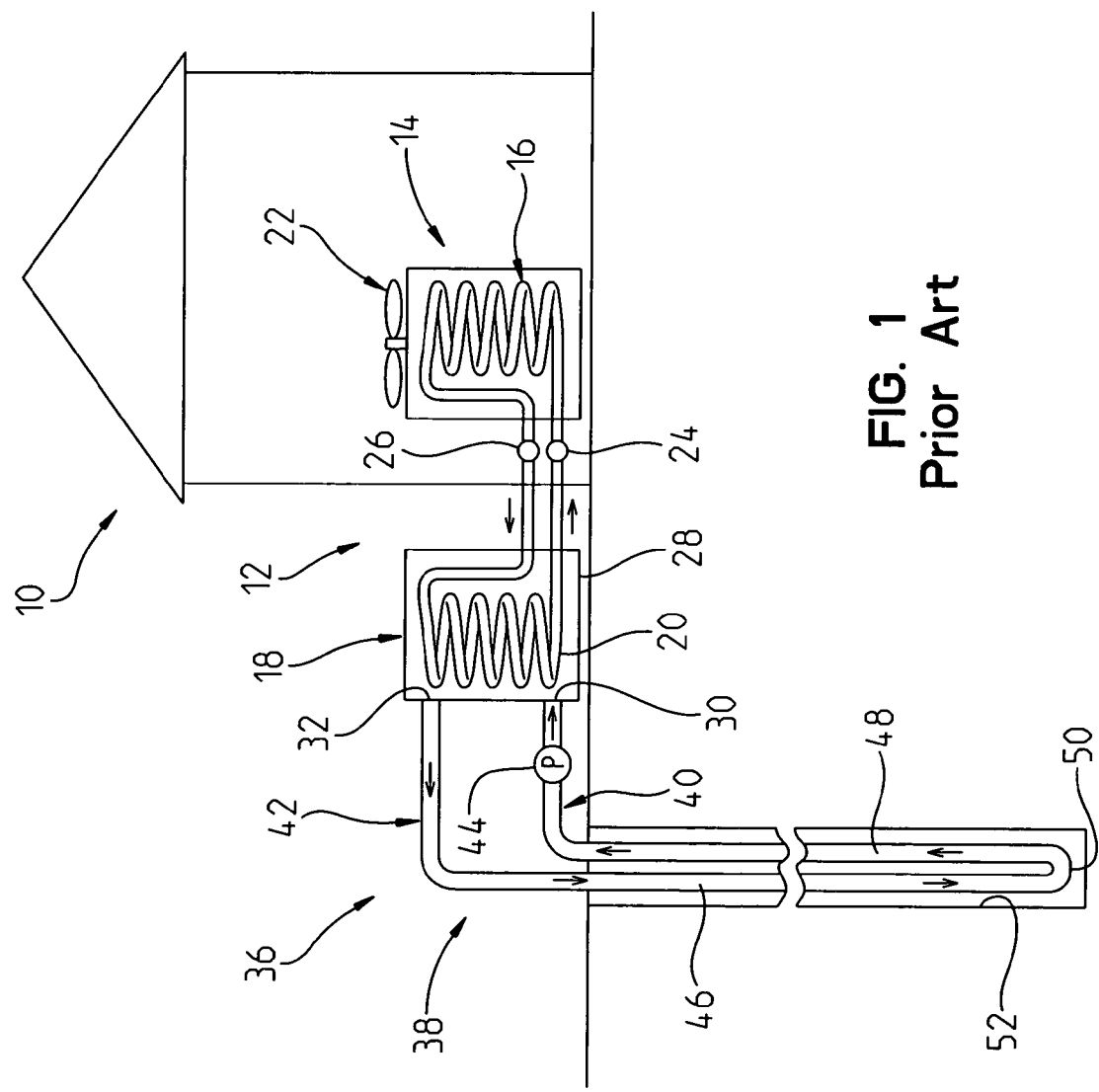
FIG. 1 is a schematic view of a prior art side-by-side geothermal heat exchange system used in connection with a mechanical refrigeration system.

Mechanical refrigeration system 112 and building 110 are generally similar to mechanical refrigeration system 12 for building 10 shown in FIG. 1. The mechanical refrigeration system 112 includes an inside (first) heat exchanger having a coil 116 through which refrigerant flows; and an outside (second) heat exchanger 118 having a coil 120 through which refrigerant flows, in the same closed loop as does the refrigerant flowing through the coil 116 of inside heat exchanger 114. A fan 122 is provided for moving air across the coil 116 of the inside heat exchanger between the coil 116 and the air flowing across the coil 116. During summer, the air can be cooled by flowing past the coil 116; and in the winter the air can be heated by flowing across the coil 116. An expansion valve 124 and compressor 126 are disposed within the loop for performing their normal functions.

The outside heat exchanger 118 includes a cabinet 128 through which water can flow that it is in thermal contact with coil 120. The cabinet 128 includes an inflow port 130 through which water can flow into the cabinet from a geothermal heat exchanger 100. An outflow port 132 is provided for conducting water from the interior of the cabinet 129 to the geothermal heat exchanger.

The geothermal heat exchange system 100 includes a subterranean portion 142, and a lateral portion 143. The subterranean portion 142 is disposed primarily underground, in a bore hole 162. The lateral portion 143, may be disposed above or below the ground, and includes a lateral outflow pipe 144 for conducting the water from the cabinet 128 to the subterranean portion 142 of the geothermal energy system 100; and a lateral inflow pipe 146 for conducting water from the subterranean portion 142 of the geothermal energy system 100 to the cabinet 128. A pump 148 is shown as being disposed in the lateral inflow pipe 146 for pumping water through the geothermal energy system 100. Alternately, the pump 148 can be disposed in the outflow pipe 144.

Although only a single subterranean portion 142 of the geothermal energy system is shown, in most cases, the geothermal energy system 100 of the present invention will include a plurality of subterranean portions 142 in a plurality of bore holes. In systems 200 that contain a large number of subterranean portions 142, several lateral pipes will be employed to extend and conduct water between the various subterranean portions. It is often necessary to employ a plurality of subterranean portions 142 and bore holes 162 in order to achieve the desired cooling capacity of the geothermal energy system 100.

The subterranean portion 142 includes three primary components, including a top cap 154, that is mateable to lateral inflow and outflow pipes 144, 146; a multi-chambered pipe 156 that extends down the bore hole for a considerable length; and a bottom cap 158. Bottom cap 158 is placed at the end of the multi-chambered pipe 156 and enables water to flow from the inflow chamber of a multi-chambered pipe 156 to the outflow chamber of the multi-chambered pipe 156. The subterranean portion 142 is disposed in a bore hole 162, having a proximal end 163 disposed near the ground surface 165, and a distal end 167 disposed at the bottom of bore hole 162, the length of which will vary depending upon the cooling capacity desired and the geologic characteristics of the area in which the bore hole is dug. Because of the compact nature of the multi-chambered pipe 156, the Applicant has found that the bore hole used with the multi-chambered pipe 156 of the present invention, can be smaller than the bore hole used with a dual, side-by-side pipe of the type shown in FIG. 1. For example, for comparable systems, the Applicant has found that a 4" diameter bore hole will work well with the multi-chambered pipe 158 of the present invention, whereas a 6" bore hole was necessary to provide sufficient space for the side-by-side two-pipe system of the type shown in FIG. 1.

The pipe can comprise one of a plurality of pipe segments, wherein the plurality of pipe segments are coupled together in a generally co-linear end to end relation to extend substantially all the way between the distal end and proximal end of the bore hole. The pipe segments when so coupled provide a generally continuous inflow chamber and outflow chamber extending substantially all the way between the distal end and proximal end of the bore.

The bore hole 162 is drilled so that its diameter is slightly larger than the diameter of the multi-chambered pipe 156, thereby forming a space between the outer surface of the multi-chambered pipe 156, and the inner surface of the bore hole 162. For environmental reasons, this space is filled with a grout, to seal the geothermal system pipe, and to isolate the water within the subterranean portion 142 of the geothermal energy system 100 from the surrounding ground, and more particularly to isolate the water in the geothermal system pipe from water in aquifers within the ground surrounding the bore hole 162.

Figure 5:
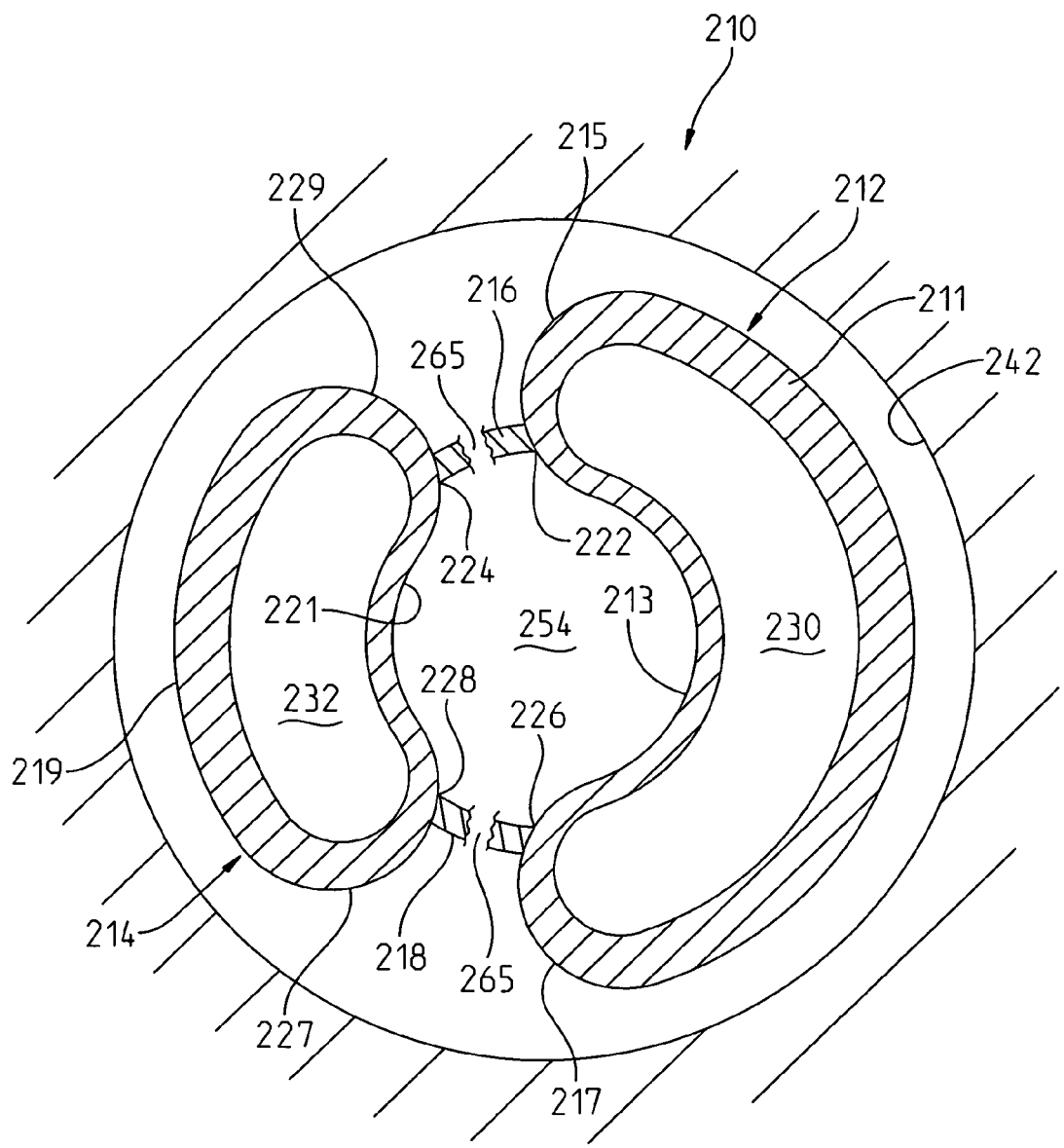
FIG. 5 is a sectional view taken along lines 5-5 of FIG. 4.
Figure 6:
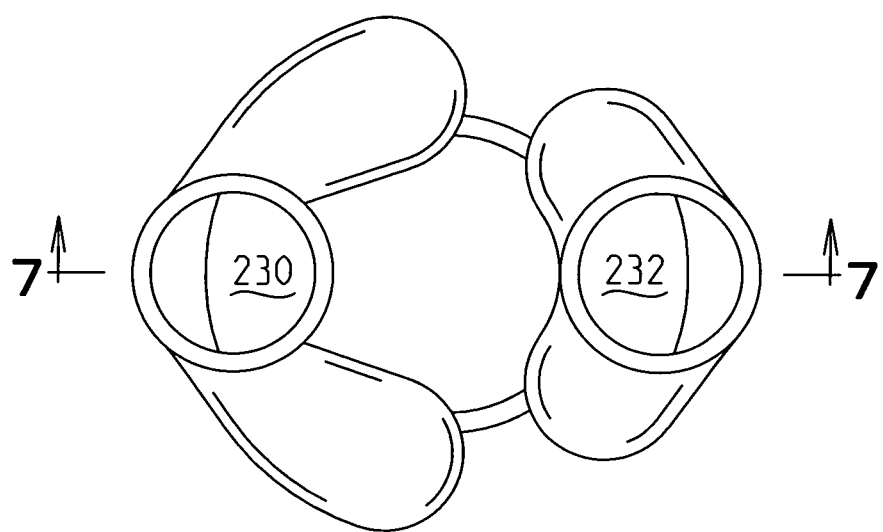
FIG. 6 is a top view of the pipe of the present invention.
Figure 7:
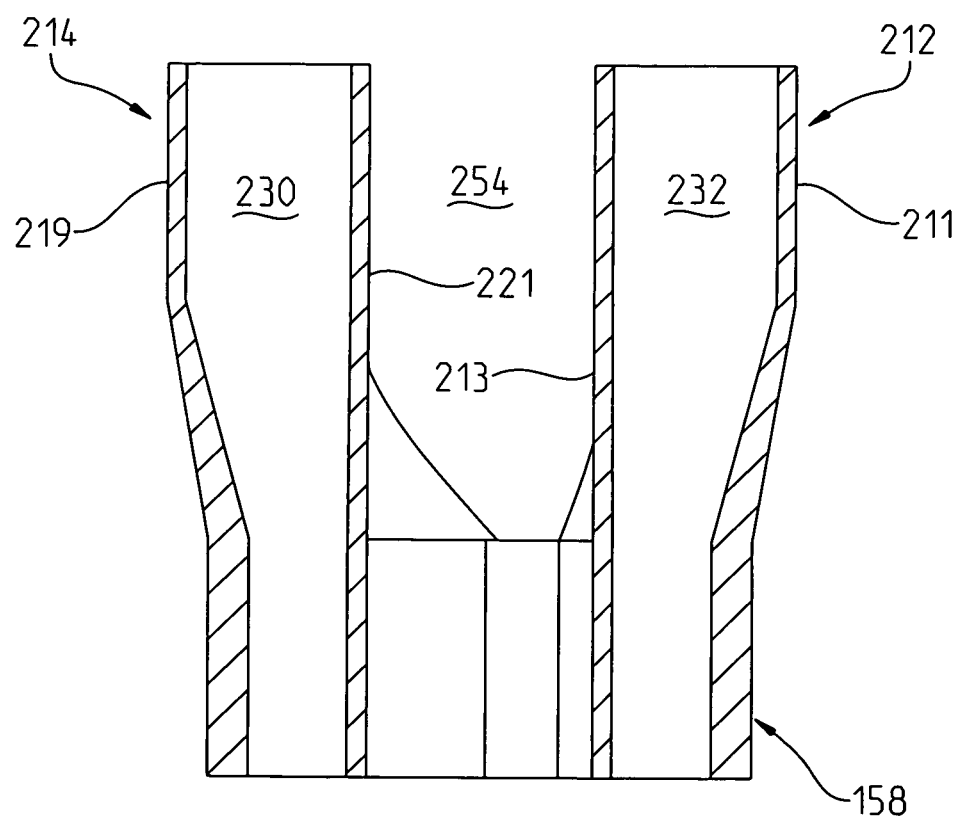
FIG. 7 is a sectional view taken along lines 7-7 of FIG. 6.
Figure 8:
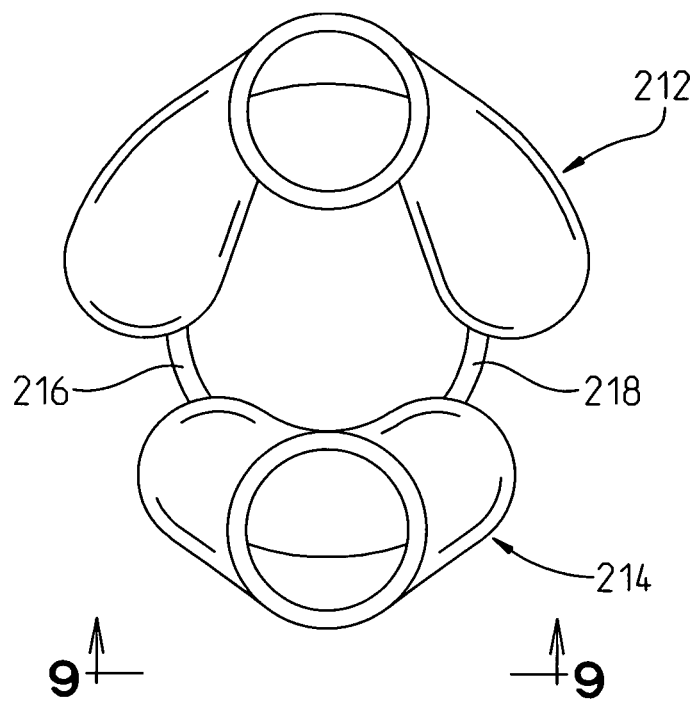
FIG. 8 is a bottom view of the present invention.
Figure 9:
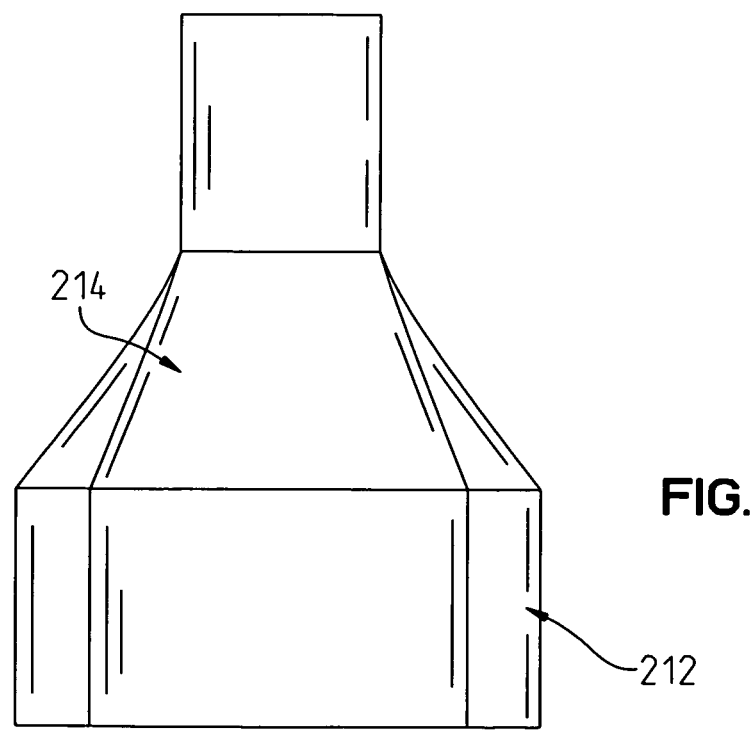
FIG. 9 is a sectional view taken along lines 9-9 of FIG. 8.
Figure 10:
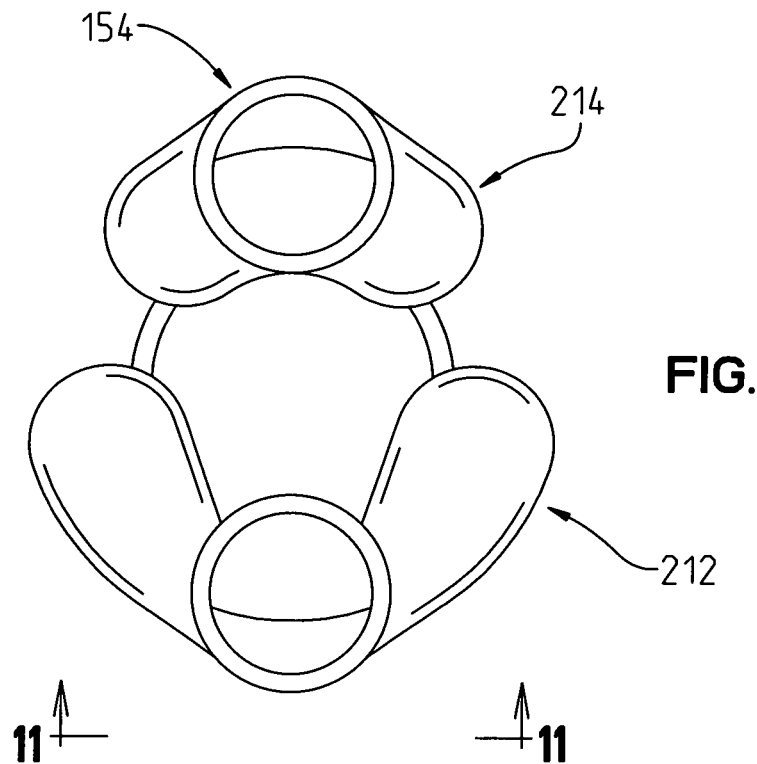
FIG. 10 is another bottom view of the present invention.
Figure 11:
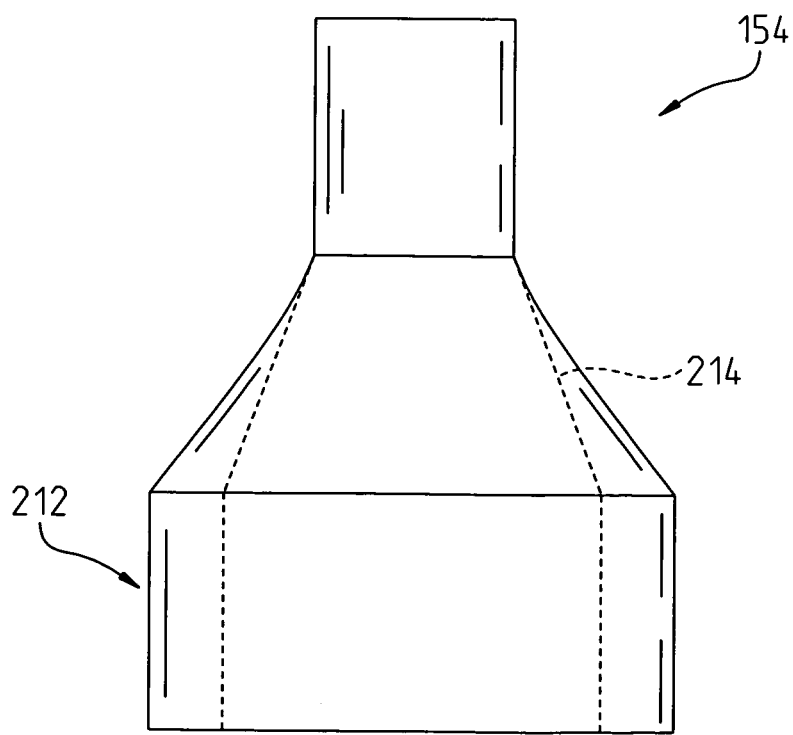
FIG. 11 is an elevational view of the present invention.
Figure 12:
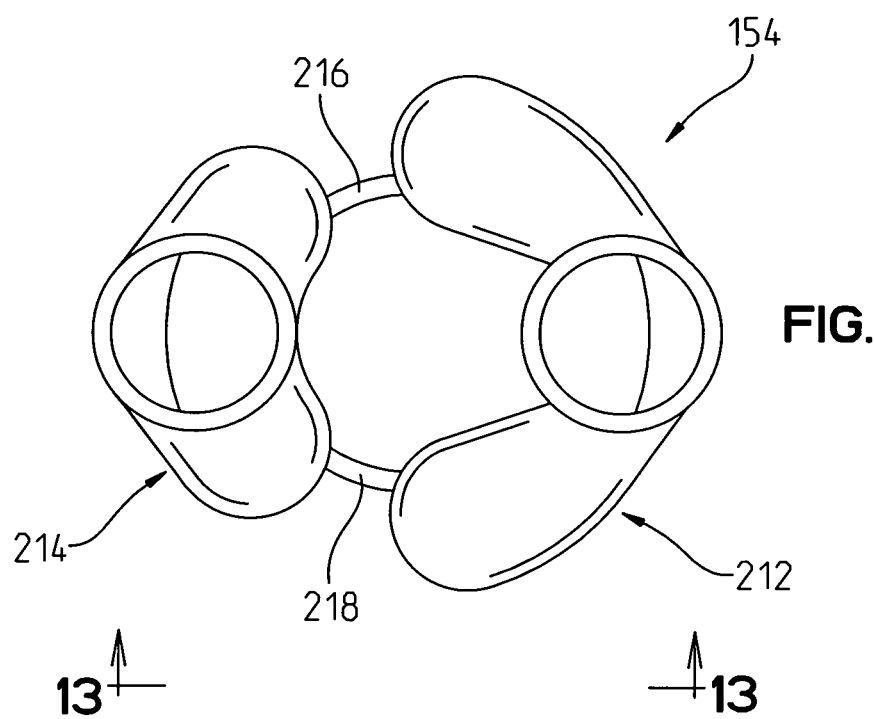
FIG. 12 is a top view of the pipe of the present invention.
Figure 13:
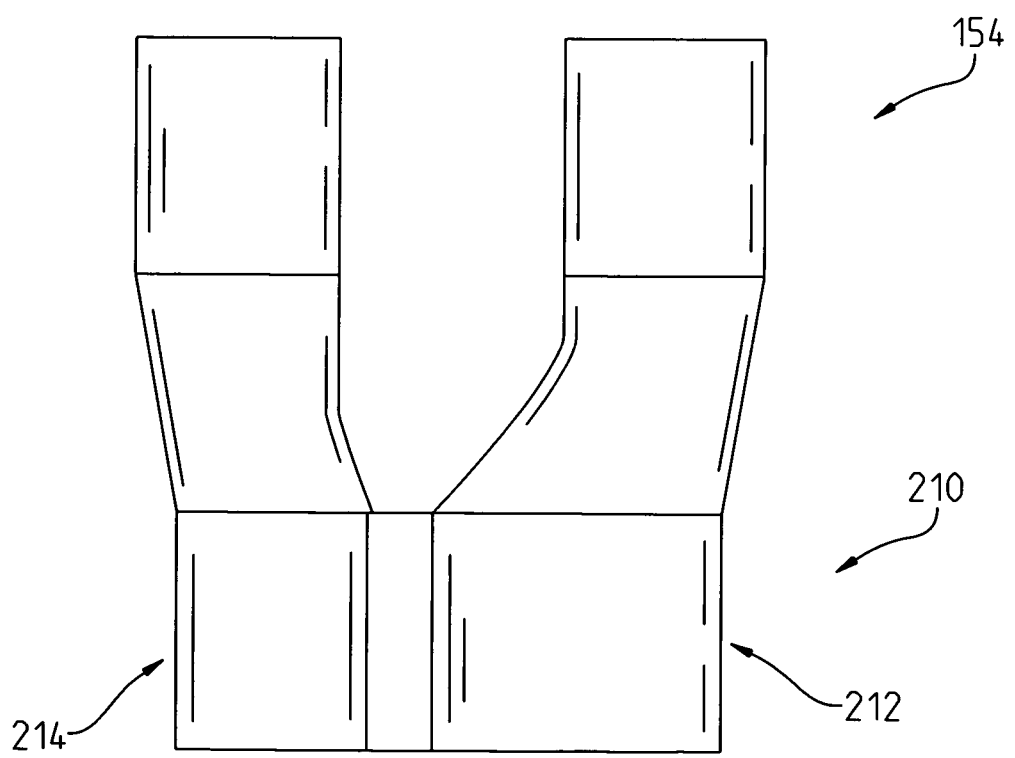
FIG. 13 is an elevational view of the pipe of the present invention shown generally along lines 13-13 of FIG. 12.
Figure 14:
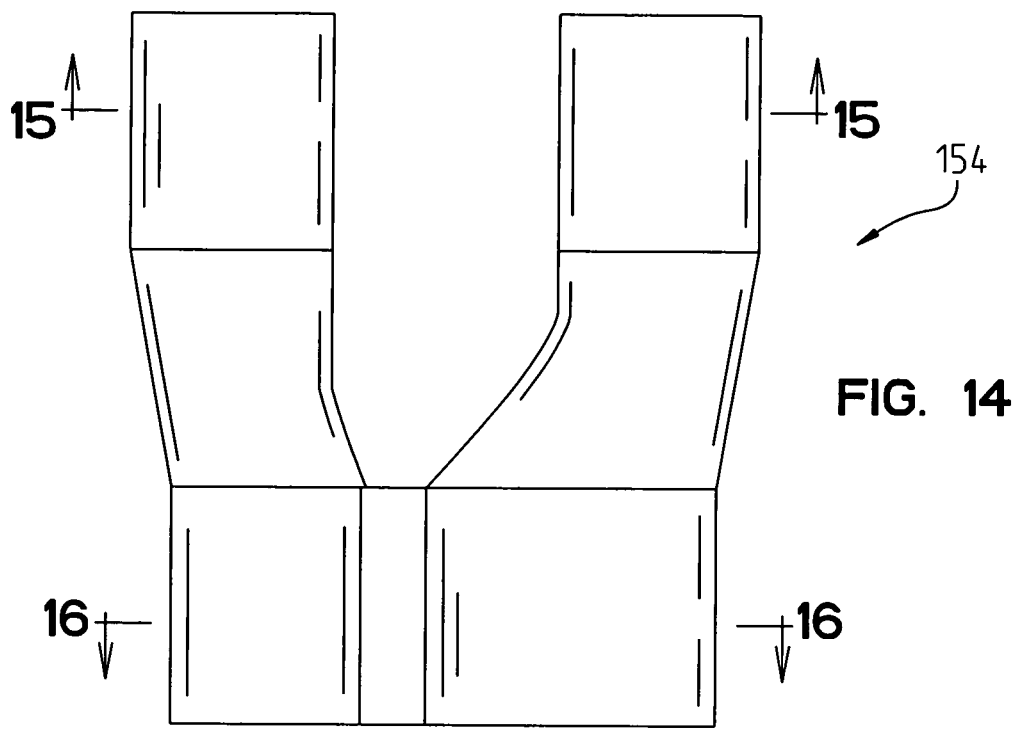
FIG. 14 is an elevational view taken near the top of the pipe, wherein the pipe joins the top cap.
Figure 15:
FIG. 15 is a sectional view of the top cap taken along lines 15-15 of FIG. 14.
Figure 16:
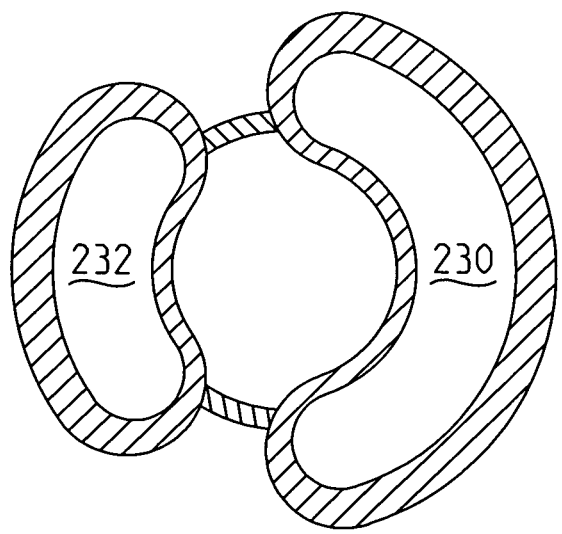
FIG. 16 is a sectional view of the pipe taken along lines 16-16 of FIG. 15.
Figure 17:
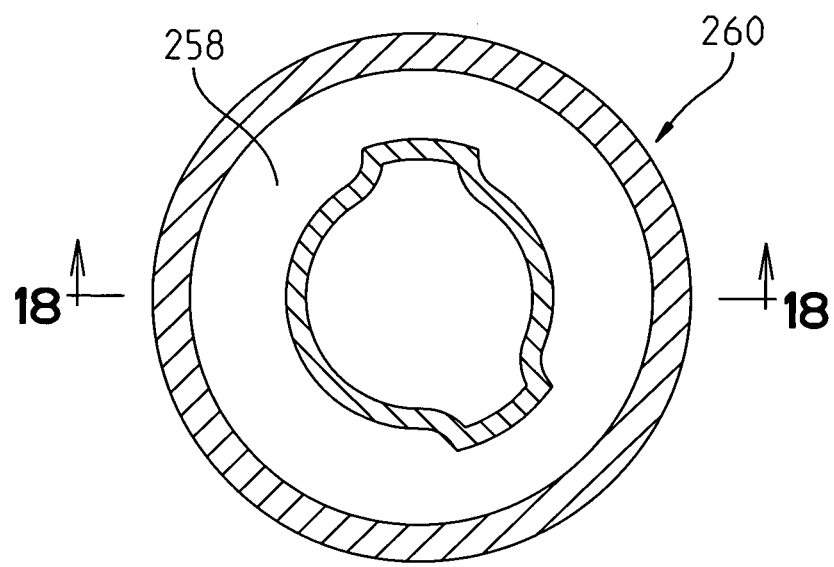
FIG. 17 is a sectional view of an end (bottom) cap member.

The pipe of the present invention is shown in FIG. 5 et seq. The pipe 210 includes a first or larger kidney-shaped (in cross section) pipe portion 212, and a second or smaller kidney-shaped (in cross section) pipe portion 214. A first, single layer wall member 216 connects the larger 212 and smaller 214 pipe portions together, and a second wall member 218 also connects together the larger pipe portion 212 and small pipe portion 214. First and second walls 216, 218 extend generally transverse to the wall portion 222, 224 at which the wall 216, 218 join the generally kidney-shaped pipe portion members 212, 214. The first 212 and second 214 kidney-shaped pipe portions do not share a common wall portion as do the pipe portions of the Hardin Bisect chamber device discussed above. The first kidney-shaped portion 212 includes a radially outwardly disposed, outer perimetral wall 211 portion and a radially inwardly disposed inner wall portion 213 (concentric with the outer wall 211), a first end portion 215 and a second end portion 217. The various portions 211, 213, 215, 217 are all arcuate. The radius of curvature of the outer wall portion 211 is greater than the radius of curvature of the inner wall portion 213. The radii of curvatures of the first and second end portions 215, 217 are generally equal, and are smaller than the radii of the curvatures of the outer 211 and inner 213 wall portions. For example, in one exemplary embodiment, the first kidney-shaped portion has a hydraulic diameter (Dh) of 1.426" (3.62 cm); a perimeter of 10.086" (25.62 cm); a cross-sectional area of 3.6059 square inches (0.00233 square meters) and a volume of 1.40 cubic foot per 100 foot of pipe (0.0396 cubic meters per 100 ft. (30.5 meters) of pipe).

Similarly, the second (outflow) kidney-shaped pipe portion 214 has an outer wall portion 219, and inner wall portion 221, a first end portion 227, and a second end portion 229. The radius of curvature of the outer wall portion 219 is generally equal to the radius of curvature of the outer wall portion 211 of the first (inflow) kidney-shaped pipe portion 212. The radius of curvature of the inner wall portion 221 is also generally equal to radius of curvature of the inner wall portion 213 of the first kidney-shaped inflow chamber portion 212, and has a smaller radius of curvature than either of the outer wall portions 211, 219. The first and second end portions 227, 229 of the second kidney-shaped outflow chamber portion 214 have radii of curvature generally similar to the radii of curvature of the first 215 and second 217 end portions of the first kidney-shaped inflow chamber portion 212, and a smaller radii of curvature than either of the outer wall portions 211, 219, or inner wall portions 213, 221.

The hydraulic diameter (Dh) of the first and second kidney-shaped chamber portions 212, 214 are generally similar, although the perimeter, cross-sectional area, and volume of the larger, first inflow chamber 212 are significantly larger than the corresponding values of the second outflow chamber portion 214. For example, in the exemplary embodiment discussed above, the smaller second outflow portion chamber 214 has a hydraulic diameter (Dh) of 1.297 inches (3.29 cm); a perimeter of 6.226 inches (15.82 cm); a cross-sectional area of 2.02 sq. inches (0.0013 sq. meters); and volume of 2.5 cubic feet (0.071 cubic meters) per 100 feet (30.5 meters) of pipe. Viewed another way, the perimeter of the smaller, second kidney-shaped portion 214 is about 65% to 75% of length of the perimeter of the larger, first portion 212, and in this embodiment, about 61% of the length of the perimeter of the larger portion 212.

The larger, first pipe portion 212 includes an interior passageway 230, and the small (outflow) pipe portion 214 also includes an interior 232 through which water flows upwardly and out of the pipe 142.

Because the inflow chamber 230 has a larger cross-sectional area and volume than the outflow chamber 232, water flowing through the first (inflow) chamber 230 flows at a slower flow rate than in the smaller, second (outflow) chamber 232. Since the outflow chamber 232 is smaller than the inflow chamber 230, water flows through the outflow chamber 232 at a higher velocity. The relatively slower velocity of flow through the inflow chamber 230 causes a greater heat exchange between the water within the interior of the chamber 230 and the area surrounding the pipe portion 212 and chamber 232. The surrounding area comprises a layer of grout G, that exists between the outer wall 240 of the first pipe portion 212, and the interior wall 242 of the bore hole B that surrounds the pipe 210, and in which the grout G 246 is disposed.

One feature that enhances the efficiency of the pipe 210 of the present invention is that there is significantly reduced heat exchange between the water in the inflow chamber 230 of first pipe portion 212 and the water in the outflow chamber 232 of the second pipe portion 214. For example, on a hot summer day, when the geothermal pipe 210 of the present invention is being used as part of an air conditioning cycle, water that enters the inflow chamber 230 of first pipe portion 212 at the top of the bore hole B will tend to be heated through its interaction of the water with the condenser portion 218 of the mechanical air conditioning system 212 that is used in the house 210 or building. This water may attain a temperature of 100 degrees F. As the water moves in chamber 232 from the top of the bore hole B, through the pipe 210 to the bottom of the bore hole B (which may be 200 to 400 feet or more down the bore hole B), the water will be cooled because the heat within the water will be lost to the grout 246 and ground 267 surrounding the first pipe portion 212. Viewed another way, the cool ground 267 through which the first portion 212 of pipe 210 passes and cool grout 246 will cool the water within the chamber 230 of the inflow portion 212. As the water in chamber 230 flows from the top to the bottom of the first inflow pipe portion 212, it may be cooled down for example from 100 degrees F. to 70 degrees F.

With known prior art pipes, the water will often increase in temperature (in an air conditioning cycle) as it moves up the outflow chamber 232 of the second portion 214 from the bottom to the top of the bore hold B. This increase in temperature occurs because of a heat exchange between the relatively hotter water in the inflow chamber 230 and the relatively cooler water in the outflow chamber 232. As such, some of the cooling difference gained in the inflow chamber 230 is lost in the outflow chamber 232, reducing the overall efficiency of the device.

However, in the pipe of the present invention, due to the smaller contact area between the inflow chamber 230 and the outflow chamber 232, which only occurs through the single layer wall 216, 218, there is less ability for water in the inflow chamber to transfer heat to the water in the outflow chamber. Additionally, heat transfer is further reduced since the inflow chamber 230 and outflow chamber 232 do not share a common wall. Further, because the velocity of the flow of water in the outflow chamber 232 is so much greater than the flow of water in the inflow chamber 230, the water is not resident in the outflow chamber 232 for a relatively shorter period of time thereby decreasing the time that heat (or coal) can be transferred to water in the outflow chamber 232 from the inflow chamber 230 water thereby enhancing thermal efficiency.

Figure 18:
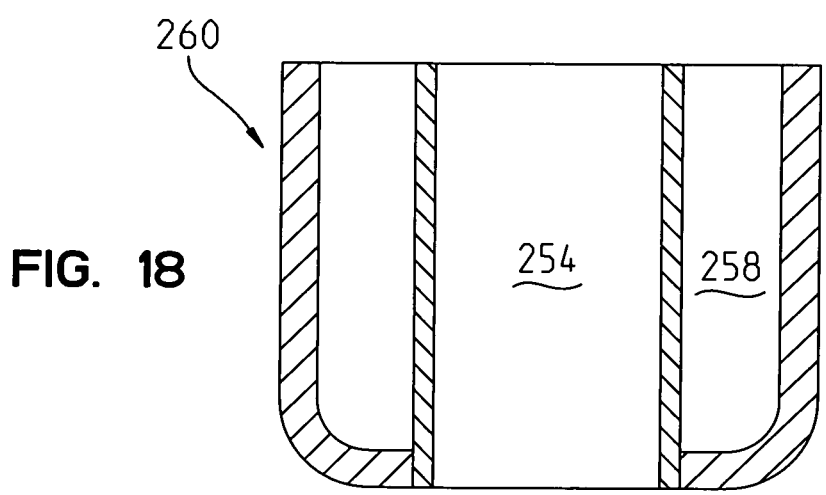
FIG. 18 is a sectional view taken along lines 18-18 of FIG. 17.
Figure 19:
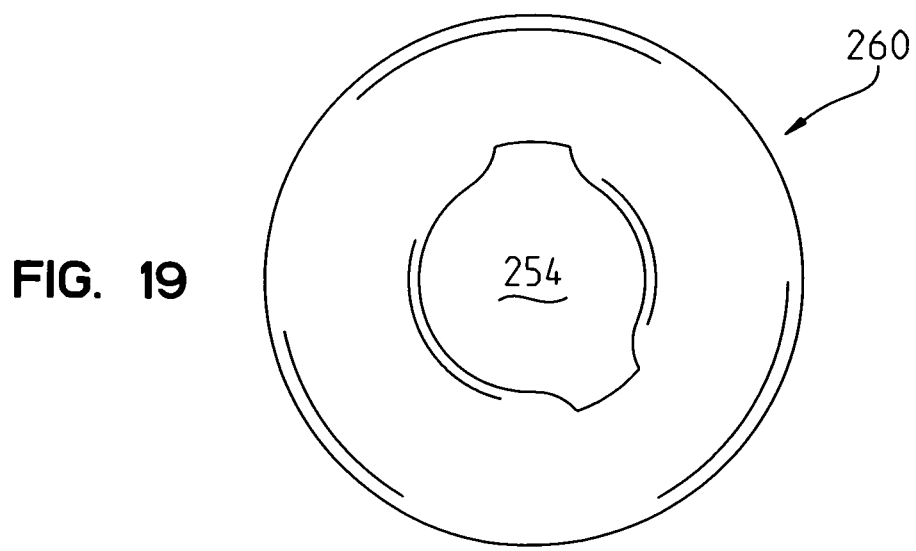
FIG. 19 is a sectional view taken along lines 19-19 of FIG. 18.

Another place where heat efficiency is achieved, is at the bottom part of the pipe 210. A bottom cap 260 is shown in FIG. 18. The end (bottom) cap 260 comprises a generally cylindrical bowl member 260. The bowl member 260 includes a cylindrical tube 261 that extends axially through the center of the bottom cap bowl 260, and is provided for receiving grout from the central grout chamber 254. However, water that flows out of the outflow chamber 230 flows into a bowl chamber 258 that comprises the interior of the bowl member 260, and then ultimately flows into the upstream (distal) end of the outflow chamber 232, and then through the outflow chamber 232 toward and out the downstream (proximal) end thereof. It has been found by the Applicant that because of the positioning and configuration of the end cap of bowl member 260, a significant amount of thermal exchange occurs between the water in the bowl 260 chamber 258, and the surrounding environment. The enhanced thermal exchange occurs because not only is heat from the water able to be conducted out the side walls 269, but also be conducted out the end walls 271. It has been noticed that once water flows through the bottom cap chamber 258, a spike in cooling rate actually occurs.

The central grout chamber extends 254 generally axially and centrally within the center of the pipe 210. Approximately every 16 inches, a radially extending aperture 265 is drilled into the side walls 216, 218. These apertures 265 allow grout to escape from the central passageway 254 and to become resident in the space 246, between the outer walls 240, 241 of the inflow chamber 230 and outflow chamber 232 respectively, and the inner surface 249 of the bore hole 242 (B).

One advantage of the single wall nature of the side walls 216, 218 of the pipe 210 is that the holes 265 that extend through the wall 216, 218 can be formed by drilling radially through the walls 216, 218. Because of the nature of the inflow and outflow of the chambers of the Hardin bisect described in the Hardin published patent application the only way to create a bore hole in the "bisect" pipe without ruining the integrity of the inflow and outflow chambers is to form a laterally extending bore hole through an injection molding process. However, the current invention, can be made by a significantly less expensive extrusion process where, as an after step, radially extending holes 265, 268 can be drilled through the side walls 216, 218 by for example, a pair of radially extending drills that are placed down stream in the extrusion process from the extrusion machine.

When the geothermal system is operating in the heating mode, the exact opposite occurs to the heat transfer in an air conditioning mode. In the heating mode, water at the top of the bore hole 242 will enter into the inflow chamber 230 at a temperature that is lower than ground temperature. As the water travels in the chamber 230 down the bore hole via the inflow chamber 212, the water becomes heated because of the heat exchange between the water and the surrounding ground 267. Then as the water flows up the outflow pipe portion 232, it flows at a more quick rate, so that the temperature gained by the water is not lost by exchanging heat with the relatively cooler water that is flowing through the inflow tube 230.

Figure 20:
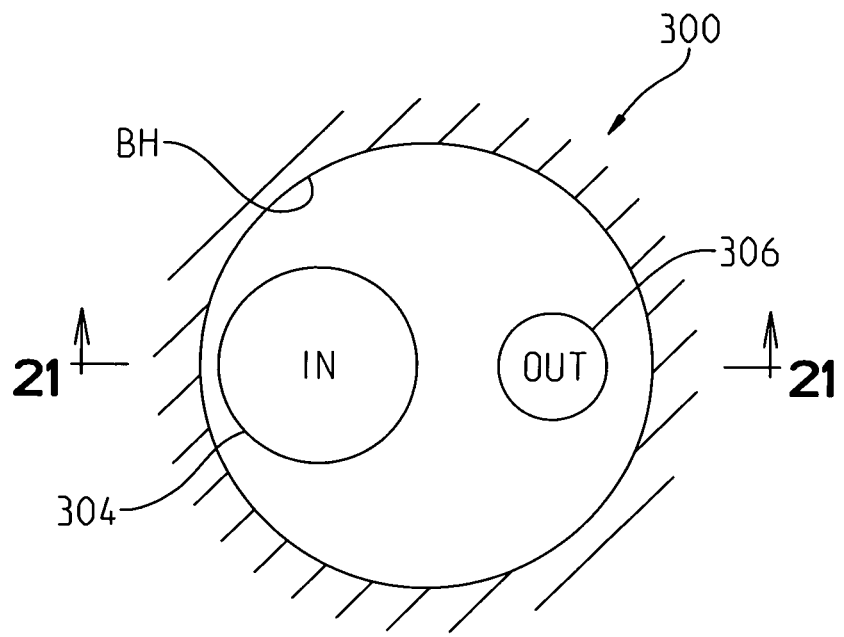
FIG. 20 is a top, schematic view of an alternate embodiment differential sized geothermal pipe system of the present invention.
Figure 21:
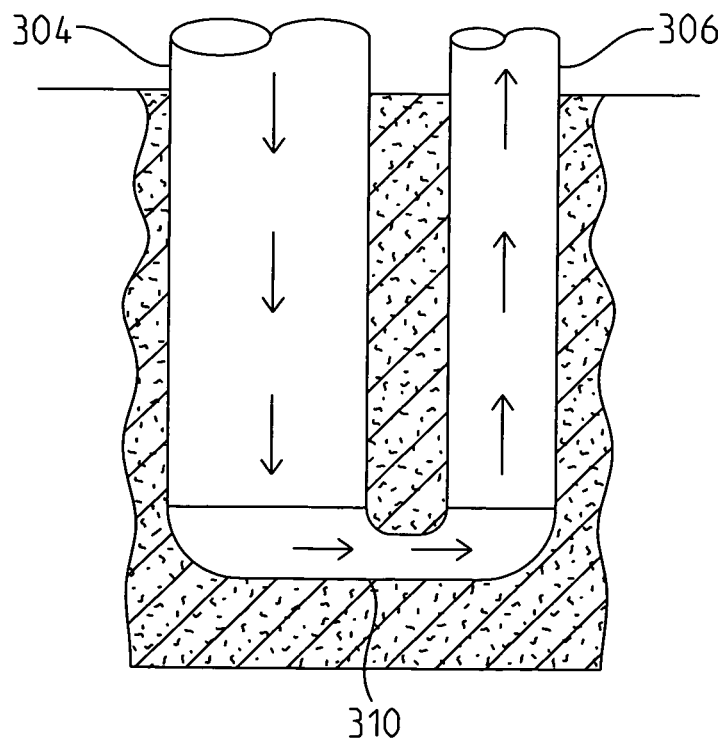
FIG. 21 is a sectional view taken along lines 21-21 of FIG. 20.

An alternate embodiment differential flow and differential sized geothermal pipe system 300 is shown in FIG. 20. System 300 shows a pipe having an inflow component 304 and an outflow pipe 306, that are placed within a bore B that has been dug into the ground. The inflow pipe 304 and out flow pipe 306 are separate pipes that are placed in a side-by-side arrangement. The inflow pipe 304 has a substantially greater diameter than the outflow pipe 306. As discussed above, this use of differential diameters of the flow pipes 304, 306 results in a differential flow rate of water in the respective flow pipes 304, 306. In particular, the greater diameter of inflow pipe portion 304, will cause water to move at a relatively slower velocity through pipe portion 304, than the water moves in the outflow pipe 306, that has a generally smaller diameter.

This relatively slower flow of water in the inflow pipe 304 helps to facilitate heat transfer between the ground and the water in the inflow pipe 304, so that the temperature of the water within the inflow pipe portion 304 can more quickly be reduced (or raised) to the ambient ground temperature.

In contrast, the relatively reduced diameter portion of the outflow pipe 306 causes the flow of water through the outflow pipe 306 to be generally much quicker than flow through the inflow pipe 304. This faster flow in the outflow pipe 306 helps to prevent the water flowing through the outflow pipe 306 from picking up heat (in the Summer), or cool (in the Winter) cause by the proximity of the pipe 306 to the inflow pipe 304.

Viewed another way, by allowing the water to flow out the outflow pipe 306 rather quickly, in a Summer situation, the relatively cooled water of the outflow pipe 306 has less residence time to thereby make it less able to pick up the heat of the relatively hotter water flowing in the inflow pipe 304. At the bottom of a pipe is an elbow tube type member 310, that is provided for coupling the bottom of the inflow pipe 304 to the bottom of the outflow pipe 306, so that water exiting at the bottom of the inflow pipe 304 flows through the elbow 310 as indicated by the arrows, and then up the outflow pipe 306.

Figure 22:
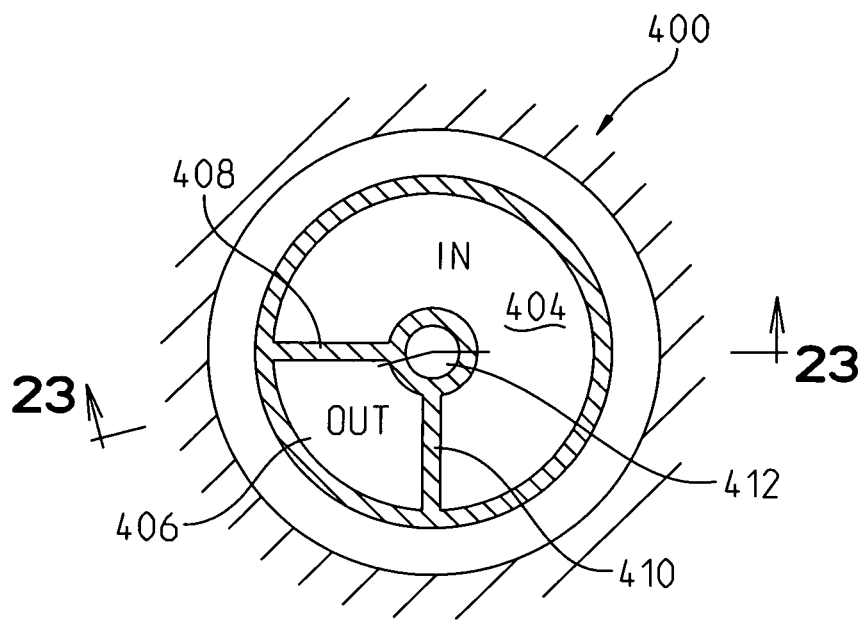
FIG. 22 is a second alternate embodiment differential sized and flow geothermal pipe system of the present invention.
Figure 23:
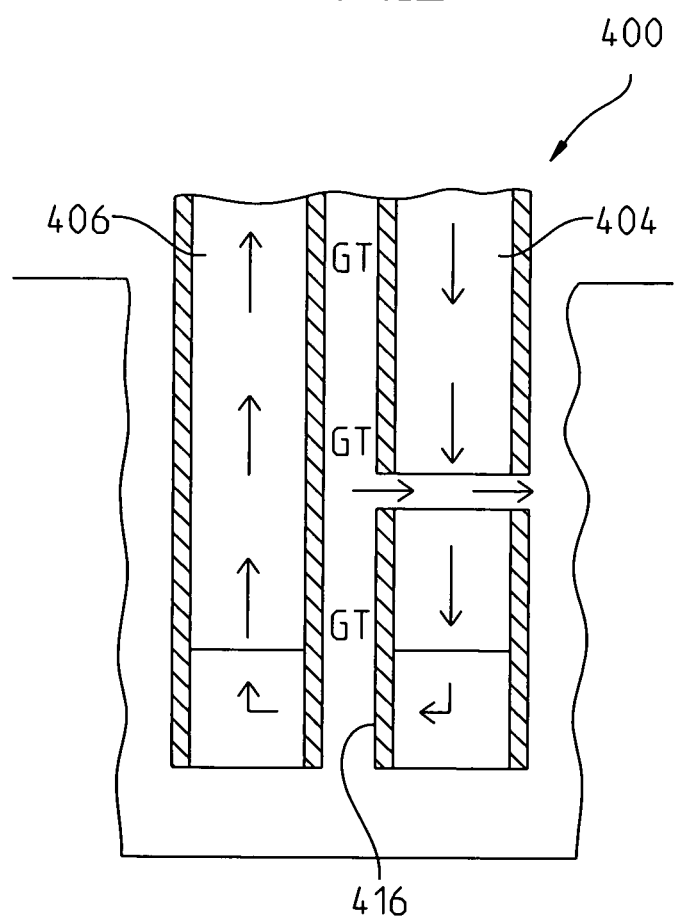
FIG. 23 is a sectional view taken along lines 23-23 of FIG. 2.
Figure 24:
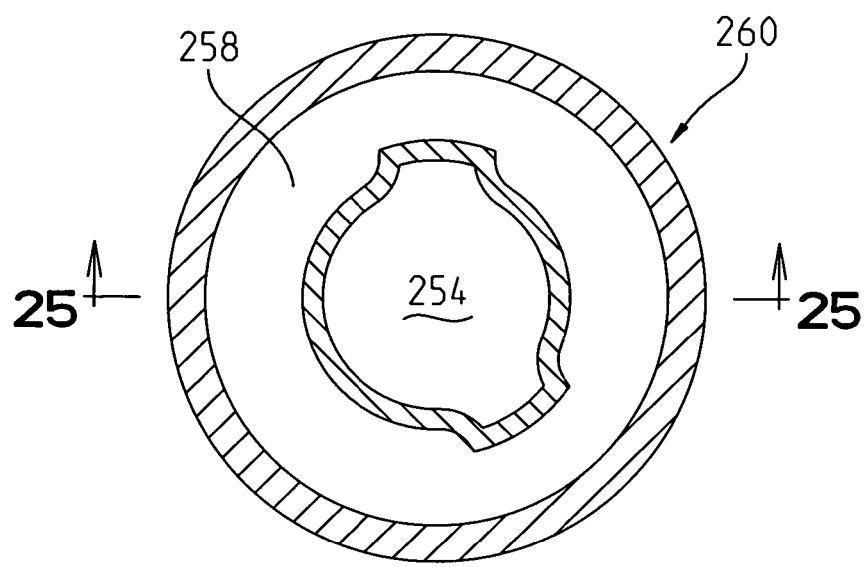
FIG. 24 is a top view of an end cap.
Figure 25:
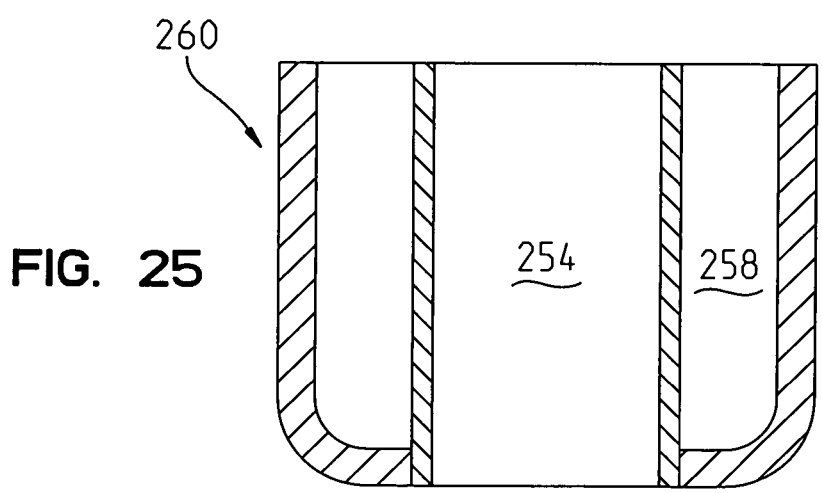
FIG. 25 is a sectional view of an end cap taken along lines 25-25 of FIG. 24.
Figure 26:
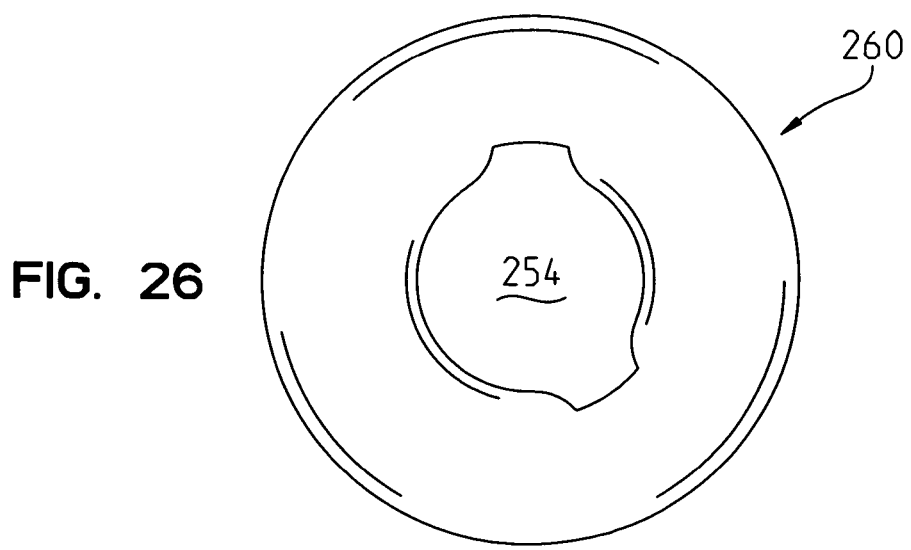
FIG. 26 is a bottom view of the bottom end cap of the present invention.

A second alternate embodiment 400 is shown in FIGS. 22 and 23.

The device shown in FIGS. 22 and 23 comprises a modification of a bisect type geothermal pipe system. In particular, the pipe 400 comprises a three-chamber pipe having a relatively larger inflow section 404, a relatively smaller outflow section 406, a pair of dividing walls 408, 410 to divide the inflow section 404 from the outflow section 406, and a central passageway 412 through which grout can travel. Grout can travel axially down through a central pipe 412, and either out the bottom of the pipe (and the bottom of the end cap through its central aperture) or alternately, out one of the side aperture 265 that are formed in the pipe 210. The side passageways allow grout being pumped down the pipe, to flow out one of the side flow aperture 265, and into the space S that exists between the exterior of the outer wall 416 of the pipe, and the interior surface of the wall W of the bore hole.

It will be noted that the wall members 408, 410 are not co-linear as in many of the bisect pipes. Rather, the dividing walls 408, 410 are placed at an angle to each other, so that the inflow chamber 404 has a relatively larger cross sectional area than the outflow chamber 406. This structure 400 will perform somewhat similarly to pipe 300, insofar as water will flow more slowly through the inflow pipe 404, and will have a higher velocity of flow through the outflow pipe 406. This permits a longer residence time of the water in the inflow pipe 404, and a relatively shorter residence time of water in the outflow pipe 406.

The grout G that is pumped down the grout pipe 412, will preferably flow into all of the grout pipe and all of the area in space S that is outside either the inflow or outflow pipes 404, 406 respectively.

Because of the particular nature of the pipe 400, and especially as a provision of the radially extending grout escape tubes 414, it is envisioned that geothermal pipe system 400 must generally be comprised of parts that are injection molded, rather than being extruded and drilled.

One advantage of the pipe of the present invention is the material from which it is made. As discussed above, most known prior art pipes are made from a polybutylene material. By contrast, the Applicant has found that a high density, bi-modally structural polyethylene material, and preferably a material known as PE-100 or PC 4710 can be used to form the pipe of the present invention (collectively referred to as Bi-Modal High Density Polyethylene (BMHDPE) to provide results that the Applicant believes will be markedly superior to prior known pipe.

BMHDPE material is a very high density plastic, when compared to the current polyethylene plastics used for a variety of purposes today. Although this relative thinness of the wall provides the advantage of reducing the amount of plastic necessary to make the pipe, it also has a more subtle and important advantage. This advantage is that the relative thinness of the wall provides for better heat transfer between the interior of the inflow and outflow passageway 230, 232 and the ground surrounding the pipe. This increased thermal conductivity has the net result of increasing the rate at which heat is transferred between the water within the passageways 230, 232 and the ground surrounding the bore hole.

Viewed another way, a pipe of a given length (e.g. 100 feet) that is made from this high density polyethylene will have a greater cooling capacity than a pipe of the same length, that is made of the prior art polybutylene material. The impact of this on cost is that one can use a shorter length of pipe to achieve a certain desired cooling capacity, which means that one can use a smaller length bore to achieve a predetermined pipe capacity than one can with the prior art pipes. The ability to use a shorter bore length has a significant impact on the cost savings of using the pipe of the present invention.

Figure 27:
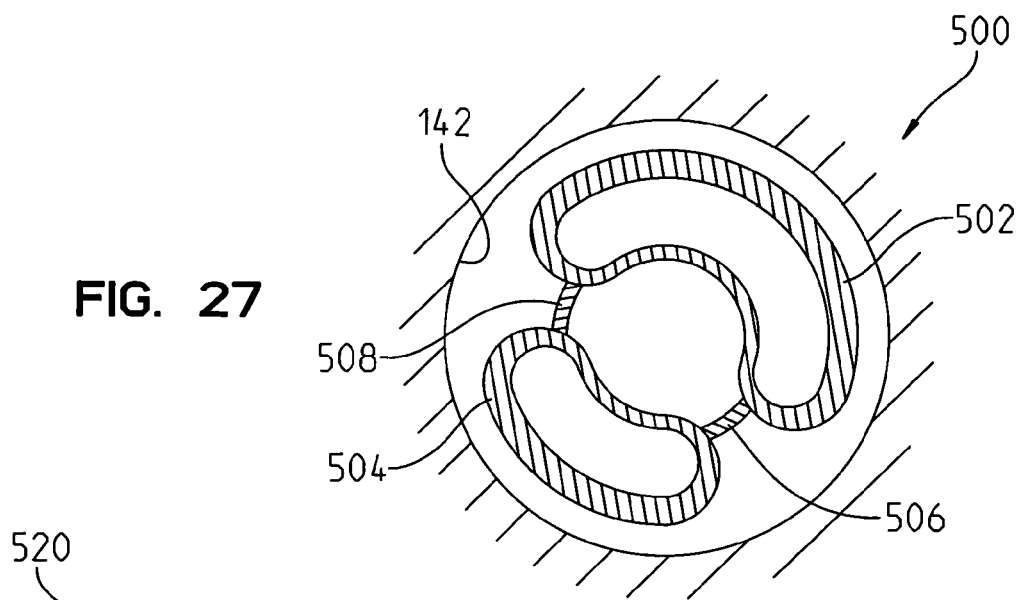
FIG. 27 is a schematic, sectional view of an alternate embodiment single piece geothermal pipe of the present invention.

Another alternate embodiment is shown FIG. 27. FIG. 27 comprises a unitarily formed geothermal pipe that includes a larger volume, kidney-shaped inflow tube 502, a relatively smaller kidney-shaped outflow tube portion 504, and a generally circular, centrally located and axially extending grout pipe 506. The pipe 500 is placed into a bore hole BH, and grout GT is poured down the hollow interior of the central pipe 506. Pipe 506 includes lateral apertures that are placed at positions such as 508, that are positioned at some place other than at the inflow or outflow pipe portions 502, 504 to allow grout to escape out the side of the grout pipe 506, and into the bore hole BH.

Figure 28:
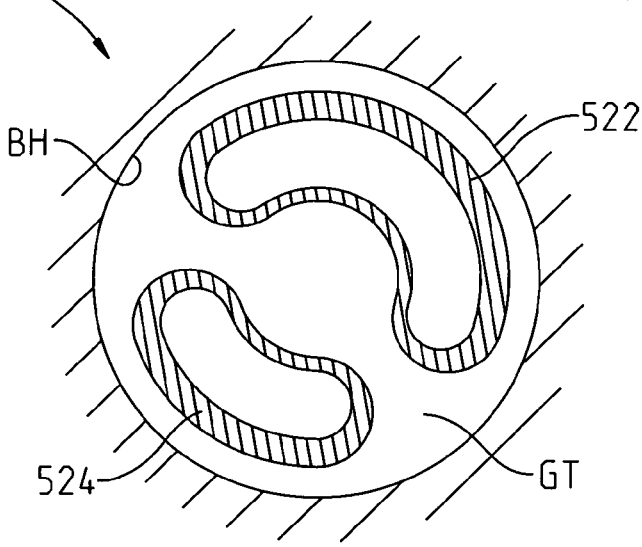
FIG. 28 is another alternate embodiment sectional view of the geothermal pipe of the present invention.

FIG. 28 is another alternate embodiment showing a grout pipe 520 comprised of two independent, and non-connected pieces including a relatively larger kidney-shaped portion 522 that serves as an inflow pipe, and a relatively smaller kidney-shaped outflow pipe portion 524.

Figure 29:
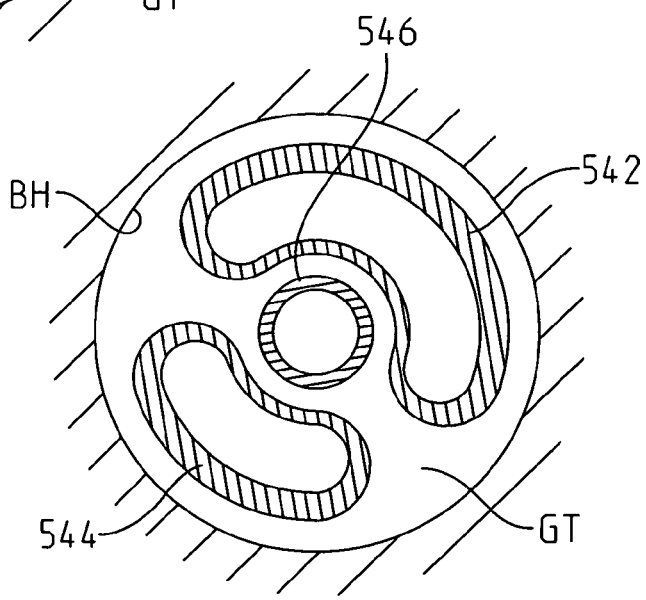
FIG. 29 is a sectional view of another alternate embodiment geothermal pipe of the present invention.

FIG. 29 shows another alternate embodiment, that is a variation of the alternate embodiment shown in FIG. 28. The embodiment 540 shown in FIG. 29 comprises a three-piece pipe, having a kidney-shaped inflow portion 542 that is generally similar to inflow portion 522 (FIG. 28) and an outflow portion 544 that is generally similar to outflow portion 524 (FIG. 28), and a third piece that comprises a generally circular cross-section, cylindrical axially extending and centrally disposed grout pipe 546.

Figure 30:
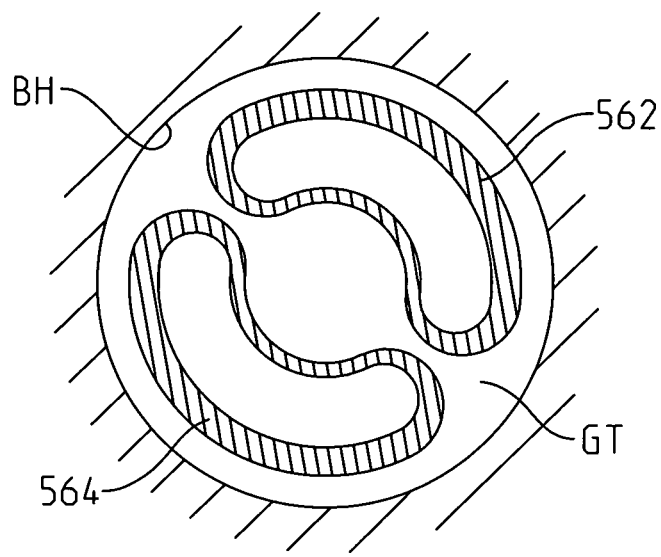
FIG. 30 is a sectional view of another alternate embodiment of the present invention.

FIG. 30 shows another alternate embodiment geothermal pipe 560. The geothermal pipe 560 includes an inflow pipe portion 562 and an outflow pipe portion 564 that are generally similarly sized, rather than differently sized, such as in FIG. 1-29 where the inflow tube has a larger volume than the outflow tube. Although the version shown in FIG. 30 would not have the relative flow rate differential advantages of the other embodiments, it would have an advantage of being less expensive to manufacture. Since the inflow and outflow pipe portions 562, 564 have identical cross-sections, they can be manufactured by the same extrusion die, thereby saving the need and cost associated with the purchase of the second die, and the transfer of the two dies on an extrusion machine.

Figure 31:
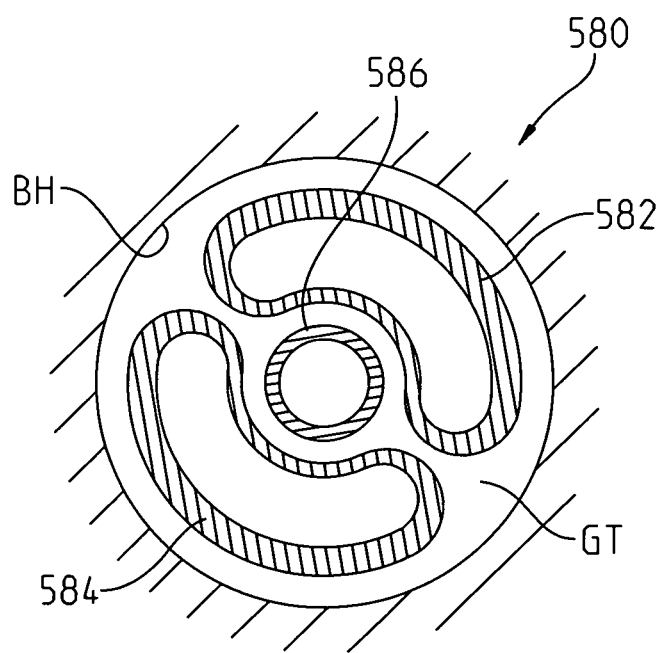
FIG. 31 is a sectional view of another alternate embodiment geothermal pipe of the present invention.

The final geothermal pipe embodiment 580 shown in FIG. 31 is generally similar to pipe 560 shown in FIG. 30, as the inflow and outflow tubes 582, 584 are both kidney-shaped and are generally have the same cross-sectional shape and size.

However, the pipe 580 shown in FIG. 31 also includes a separate, third component that comprises a grout pipe 586 that is centrally disposed and extends axially down the length of the pipe.

Although the invention has been described with reference to certain preferred embodiments, it will appreciated that the invention should not be limited by these preferred embodiments, but rather be construed much more broadly to include other similar structures and configurations within the scope and spirit of the present invention.

What is claimed:

1. A pipe for use in a re-circulating geothermal heat exchange system, the pipe being insertable in a bore having a proximal end disposed relatively closer to a surface of the earth and a distal end disposed relatively further from the surface of the earth, the pipe comprising
an inflow pipe portion having a first end disposed adjacent to the proximal end of the bore and a second end disposed adjacent to the distal end of the bore, an outer wall portion and an inner wall portion extending between the first and second ends for defining an inflow chamber that extends between the first end and the second end of the inflow pipe portion through which water can flow between the first and second end of the inflow pipe portion in a direction toward the distal end of the bore hole;
an outflow pipe portion having a first end disposed adjacent to the proximal end of the bore and a second end disposed adjacent to the distal end of the bore, an outer wall and an inner wall portion extending between the first and second ends for defining an outflow chamber that extends between the first end and the second end of the outflow portion through which water can flow between the second end and first end of the outflow pipe portion in a direction toward the proximal end of the bore, and
a first connector member having a first end coupled to the inflow pipe portion and a second end coupled to the outflow pipe portion the first connector member at least partially defining an axially extending passageway that extends between the first and second ends of the pipe portion, wherein the first connector member extends between the inflow pipe portion and the outflow pipe portion to maintain the inflow and outflow chambers in a spaced relation wherein the inflow chamber and outflow chamber do not share a common wall.

2. The pipe of claim 1 wherein the first connector member intersects each of the inflow pipe portion and outflow pipe portion at an angle of between about 5° and 175°.

3. The pipe of claim 1 further comprising a second connector member having a first end coupled to inflow pipe portion and a second end coupled to the outflow pipe portion, wherein the first and second connectors, the inflow pipe portion and the outflow pipe portion define the axially extending passageway that extends between the first and second ends of the pipe portion.

4. The pipe of claim 3 wherein east one of the first and second connectors includes a series of apertures for permitting a grout material within the axially extending passageway to flow between the axially extending passageway and into a space disposed exteriorly of the outer wall of at least one of the inflow pipe portion and outflow pipe portion for forming a grout casing that surrounds the pipe.

5. The pipe of claim 3 wherein each of the first and second connectors are positioned relative to the inflow and outflow pipe portions so that the series of apertures do not extend through either an inflow chamber or the outflow chamber.

6. The pipe of claim 5 wherein each of the series of apertures for permitting material within the axially extending passageway to flow comprise a first series of apertures extending generally radially through the first connector and a second series of apertures extending generally radially through the second connector.

7. The pipe of claim 5 wherein each of the first and second connectors comprise single wall-like structures and the pipe has a generally constant cross-section to permit the pipe to be formed by an extrusion process, and wherein the first and second series of apertures are drilled apertures drilled in the first and second connectors after the extrusion of the pipe.

8. The pipe of claim 7 wherein the first and second connectors comprise arcuate walls that scribe an arc about a radius having its center disposed within the axially extending passageway.

9. The pipe of claim 7 wherein the inflow pipe portion includes a first end portion and a second end portion for coupling the outer wall portion and inner wall portion and further defining the inflow chamber; and
wherein the outflow pipe portion includes a first end portion and a second end portion for coupling the outer wall portion and inner wall portion and further defining the inflow chamber.

10. The pipe of claim 9 wherein the outer wall portion and the inner wall portion of the inflow pipe portion scribe an arc about a radius having its center disposed in the axially extending passageway.

11. A pipe for use in a re-circulating geothermal heat exchange system, the pipe being insertable in a bore having a proximal end disposed relatively closer to a surface of the earth and a distal end disposed relatively further from the surface of the earth, the pipe comprising
an inflow pipe portion having a first end disposed adjacent to the proximal end of the bore and a second end disposed adjacent to the distal end of the bore, an outer wall portion and an inner wall portion extending between the first and second ends for defining an inflow chamber that extends between the first end and the second end of the inflow pipe portion through which water can flow between the first and second end of the inflow pipe portion in a direction toward the distal end of the bore hole;

an outflow pipe portion having a first end disposed adjacent to the proximal end of the bore and a second end disposed adjacent to the distal end of the bore, an outer wall and an inner wall portion extending between the first and second ends for defining an outflow chamber that extends between the first end and the second end of the outflow portion through which water can flow between the second end and first end of the outflow pipe portion in a direction toward the proximal end of the bore, and a first connector member having a first end coupled to the inflow pipe portion and a second end coupled to the outflow pipe portion the first connector member at least partially defining an axially extending passageway that extends between the first and second ends of the pipe portion, wherein the pipe comprises a plurality of pipe segments, wherein the plurality of pipe segments are coupled together in a generally co-linear end to end relation to extend substantially all the way between the distal end and proximal end of the bore, the pipe segments when so coupled providing a generally continuous inflow chamber and outflow chamber extending substantially all the way between the distal end and proximal end of the bore.

12. A pipe for use in a re-circulating geothermal heat exchange system, the pipe being insertable in a bore having a proximal end disposed relatively closer to a surface of the earth and a distal end disposed relatively further from the surface of the earth, the pipe comprising an inflow pipe portion having a first end disposed adjacent to the proximal end of the bore and a second end disposed adjacent to the distal end of the bore, an outer wall portion and an inner wall portion extending between the first and second ends for defining an inflow chamber that extends between the first end and the second end of the inflow pipe portion through which water can flow between the first and second end of the inflow pipe portion in a direction toward the distal end of the bore hole;

an outflow pipe portion having a first end disposed adjacent to the proximal end of the bore and a second end disposed adjacent to the distal end of the bore, an outer wall and an inner wall portion extending between the first and second ends for defining an outflow chamber that extends between the first end and the second end of the outflow portion through which water can flow between the second end and first end of the outflow pipe portion in a direction toward the proximal end of the bore, wherein one of the inflow chamber and outflow chamber has a relatively greater volume, and the other of the inflow chamber and outflow chamber has a relatively smaller volume, wherein the chamber housing the smaller volume facilitates a greater velocity of flow of water therein than the velocity of flow in the chamber having the relatively greater volume and a first connector member having a first end coupled to the inflow pipe portion and a second end coupled to the outflow pipe portion the first connector member at least partially defining an axially extending passageway that extends between the first and second ends of the pipe portion.

13. The pipe of claim 12 wherein the inflow chamber has a greater volume than the outflow chamber to permit a relatively shorter residence time for water in the outflow chamber than the water in the inflow chamber for reducing the ability of water in the inflow chamber to change the temperature of water in the outflow chamber.

14. The pipe of claim 13 wherein the volume of the outflow chamber is between about 40% and 70% of the volume of the inflow chamber.

15. A pipe for use in a re-circulating geothermal heat exchange system, the pipe being insertable in a bore having a proximal end disposed relatively closer to a surface of the earth and a distal end disposed relatively further from the surface of the earth, the pipe comprising an inflow pipe portion having a first end disposed adjacent to the proximal end of the bore and a second end disposed adjacent to the distal end of the bore, an outer wall portion and an inner wall portion extending between the first and second ends for defining an inflow chamber that extends between the first end and the second end of the inflow pipe portion through which water can flow between the first and second end of the inflow pipe portion in a direction toward the distal end of the bore hole;

an outflow pipe portion having a first end disposed adjacent to the proximal end of the bore and a second end disposed adjacent to the distal end of the bore, an outer wall and an inner wall portion extending between the first and second ends for defining an outflow chamber that extends between the first end and the second end of the outflow portion through which water can flow between the second end and first end of the outflow pipe portion in a direction toward the proximal end of the bore, wherein the outer wall portion of the inflow pipe portion includes a perimetrally disposed, partly cylindrical portion and the inner wall portion of the inflow pipe includes a partly cylindrical portion disposed interiorly of and generally concentrically with the perimetrally disposed cylindrical portion of the inflow pipe portion and a first connector member having a first end coupled to the inflow pipe portion and a second end coupled to the outflow pipe portion the first connector member at least partially defining an axially extending passageway that extends between the first and second ends of the pipe portion.

16. The pipe of claim 15 wherein the volume of one of the inflow chamber and outflow chamber is relatively greater than the volume of the other of the inflow chamber and outflow chamber to promote a relatively greater flow velocity in the chamber having the relatively smaller volume.

17. A pipe section for use as a member of a pipe for use in a re-circulating geothermal heat exchange system, the pipe section being capable of being coupled to at least a second pipe section to form a pipe that is insertable in a bore having a proximal end disposed relatively closer to a surface of the earth and a distal end disposed relatively further from the surface of the earth, the pipe section comprising an inflow pipe portion having a first end and a second end, an outer wall portion an inner wall portion, a first side wall portion and a second side wall portion extending between the first and second ends for defining an inflow chamber that extends between the first end and the second end of the inflow pipe portion through which water can flow between the first and second end of the inflow pipe portion in a direction toward the distal end of the bore hole;

an outflow pipe portion having a first end and a second end, an outer wall portion, an inner wall portion, a first side wall portion and a second side wall portion extending between the first and second ends for defining an outflow chamber that extends between the first end and the second end of the outflow portion through which water which flows out of the inflow pipe can flow between the second end and first end of the outflow pipe portion in a direction toward the proximal end of the bore, and a first connector member having a first end coupled to the first side wall portion of the inflow pipe portion and a second end coupled to the second side wall portion of the outflow pipe portion, and a second connector member having a first end coupled to the second side wall portion of the inflow pipe portion and a second end coupled to the first side wall portion of the outflow pipe portion, wherein the first connector member, second connector member, inflow pipe portion and outflow pipe portion define an axially extending passageway that extends between the first and second ends of the pipe section, wherein the first and second connector member extends between the inflow pipe portion and the outflow pipe portion to maintain the inflow and outflow chambers in a spaced relation wherein the inflow pipe portion and the outflow pipe portion do not share a common wall.

18. The pipe of claim 1 wherein the inflow pipe portion includes a first side wall portion and a second side wall portion extending between the first and second ends, the outflow pipe portion includes a first side wall portion and a second side wall portion extending between the first and second ends, wherein the first connector member has a first end coupled to the first side wall portion of the inflow pipe portion and a second end coupled to the second side wall portion of the outflow pipe portion, and further comprising a second connector member having a first end coupled to the second side wall portion of the inflow pipe portion and a second end coupled to the first side wall portion of the outflow pipe portion.

* * * * *